(12) United States Patent
Newman

(10) Patent No.: US 9,758,030 B2
(45) Date of Patent: Sep. 12, 2017

(54) REPLACEABLE BATTERY ASSEMBLY HAVING A LATCHING MECHANISM

(71) Applicant: NextEV USA, Inc., San Jose, CA (US)

(72) Inventor: Austin Lawrence Newman, San Jose, CA (US)

(73) Assignee: NextEV USA, Inc., San Jose, CA (US)

( * ) Notice: Subject to any disclaimer, the term of this patent is extended or adjusted under 35 U.S.C. 154(b) by 0 days.

(21) Appl. No.: 15/224,660

(22) Filed: Jul. 31, 2016

(65) Prior Publication Data

US 2017/0225557 A1 Aug. 10, 2017

Related U.S. Application Data

(60) Provisional application No. 62/293,220, filed on Feb. 9, 2016, provisional application No. 62/300,467, filed on Feb. 26, 2016.

(51) Int. Cl.
*B60K 1/04* (2006.01)
*B60S 5/06* (2006.01)
*H01M 2/10* (2006.01)

(52) U.S. Cl.
CPC ........ *B60K 1/04* (2013.01); *B60S 5/06* (2013.01); *H01M 2/1083* (2013.01); *B60K 2001/0438* (2013.01); *B60K 2001/0472* (2013.01); *H01M 2220/20* (2013.01)

(58) Field of Classification Search
CPC ... B60K 1/00; B60K 1/02; B60K 1/04; B60K 1/08
See application file for complete search history.

(56) References Cited

U.S. PATENT DOCUMENTS

| | | | |
|---|---|---|---|
| 5,501,289 A | 3/1996 | Nishikawa et al. | |
| 7,201,384 B2* | 4/2007 | Chaney | B60K 1/04 180/68.5 |
| 7,913,788 B1 | 3/2011 | Bryer et al. | |
| 8,210,301 B2 | 7/2012 | Hashimoto et al. | |
| 9,045,030 B2* | 6/2015 | Rawlinson | B60K 1/04 |
| 2010/0009244 A1 | 1/2010 | Murata | |
| 2011/0198138 A1 | 8/2011 | Sadrmajles et al. | |
| 2012/0009804 A1 | 1/2012 | Heichal et al. | |
| 2012/0312612 A1 | 12/2012 | Harrison et al. | |
| 2013/0175829 A1 | 7/2013 | Kim et al. | |

(Continued)

FOREIGN PATENT DOCUMENTS

DE 202015005208 8/2015

OTHER PUBLICATIONS

U.S. Appl. No. 15/224,659, filed Jul. 31, 2016, Newman.
(Continued)

*Primary Examiner* — John Walters
*Assistant Examiner* — James Triggs
(74) *Attorney, Agent, or Firm* — Sheridan Ross P.C.

(57) ABSTRACT

A removable battery assembly includes a battery pack having a plurality of electrical storage devices; and a latching mechanism for securing the battery pack to a frame structure of a vehicle. The latching mechanism has a first latch part configured to be attached to the frame structure and a second latch part on the battery pack. The second latch part is configured to receive at least a portion of the first latch part. The latching mechanism also has a biasing seal configured to bias the latching mechanism into a latched position.

20 Claims, 11 Drawing Sheets

(56) References Cited

U.S. PATENT DOCUMENTS

2013/0270864 A1  10/2013  Young et al.
2014/0284125 A1   9/2014  Katayama et al.
2014/0338998 A1  11/2014  Fujii et al.
2014/0338999 A1  11/2014  Fujii et al.
2015/0255764 A1   9/2015  Loo et al.
2016/0068195 A1   3/2016  Hentrich et al.
2016/0137229 A1   5/2016  Nishida

OTHER PUBLICATIONS

U.S. Appl. No. 15/224,661, filed Jul. 31, 2016, Newman.
U.S. Appl. No. 15/246,856, filed Aug. 25, 2016, Newman et al.
Official Action for U.S. Appl. No. 15/224,659, mailed Mar. 21, 2017, 11 pages.
Official Action for U.S. Appl. No. 15/224,661, dated Jun. 6, 2017, 8 pages, Restriction Requirement.
International Search Report and Written Opinion for International Patent Application No. PCT/US17/17137, dated Jun. 6, 2017, 13 pages.

\* cited by examiner

REPLACEABLE BATTERY ASSEMBLY HAVING A LATCHING MECHANISM

PRIORITY CLAIM

This application claims priority under 35 U.S.C. §119 to U.S. Provisional Application No. 62/293,220, filed on Feb. 9, 2016, and U.S. Provisional Application No. 62/300,467, filed on Feb. 26, 2016, both of which are expressly incorporated by reference herein in their entirety.

FIELD OF INVENTION

The present invention relates to a replaceable battery assembly, and, more particularly, to a replaceable battery assembly having a latching mechanism for removably attaching a battery pack to a vehicle frame structure.

BACKGROUND

Electric vehicles have proven to be a viable alternative to gasoline-powered cars. The increasing demand for electric vehicles has placed importance on the development of the associated technology and the planning of an infrastructure that will support the many electric vehicles that will be on the roads in the future.

Most of the electric vehicles currently on the market were designed and manufactured according to a recharging-model, in which a vehicle uses the same, periodically-recharged battery pack over a long period of time. This model suffers from some drawbacks, however, because it requires car owners to allot an amount of time for recharging in which the car cannot be used. Further, planning must be made to ensure that the vehicle is near a charging station when the battery needs to be recharged. This limits the use of the vehicle to certain routes, ranges, and locations.

Vehicles designed and manufactured according to a battery replacement-model, on the other hand, allow a drained battery to be replaced with a charged battery, instead of recharged. These vehicles may overcome many of the problems associated with the recharging-model if an associated battery replacement process is otherwise faster than and more readily-available than the alternative recharging process. Moreover, a replacement-battery infrastructure may be more feasible and applicable for at least some implementation areas than it's recharging-model counterpart. In order to achieve these goals a viable design would include features that address issues such as standardization, safety, ease-of-use, and logistics. However, current battery replacement-model electric vehicles have yet to find solutions for many of the problems that arise in these areas.

For example, current designs for recharging-model electric vehicles, such as that described in U.S. Pat. No. 9,045,030, call for rigid attachment of battery packs through a large number of bolts. While such a configuration helps provide rigidity and protection to the battery pack, it is not practical when the battery pack is intended to be replaced many times over the lifetime of the vehicle. While some configurations, such as U.S. Pat. No. 7,201,384 and U.S. Patent Application Publication No. 2012/009804, include designs which contemplate battery replacement, there remains a need for an attachment mechanism which is quick, secure, broadly applicable to different vehicles and different batteries, and particularly suitable for automation.

The present disclosure is directed to overcoming one or more problems of the prior art.

SUMMARY

In one aspect, the present disclosure is directed to a replaceable battery assembly. The replaceable battery assembly includes a battery pack having a plurality of electrical storage devices; and a latching mechanism for securing the battery pack to a frame structure of a vehicle. The latching mechanism includes a first latch part configured to be attached to the frame structure and a second latch part on the battery pack. The second latch part is configured to receive at least a portion of the first latch part. The latching mechanism also includes a biasing seal configured to bias the latching mechanism into a latched position.

In another aspect, the present disclosure is directed to a vehicle. The vehicle includes a body forming a passenger compartment, a chassis supporting the body, the chassis including a frame structure; and a removable battery assembly. The removable battery assembly includes a battery pack including a plurality of electrical storage devices enclosed in a container, and a latching mechanism for securing the battery pack to the frame structure. The latching mechanism includes a first latch part on the frame structure, and a second latch part on the battery pack. The second latch part is configured to connect to the first latch part to attach the battery. The latching mechanism also includes a biasing seal configured to bias the latching mechanism into a latched position.

In yet another aspect, the present disclosure is directed to a method of attaching a battery pack to a vehicle. The vehicle includes a body forming a passenger compartment and a chassis having a frame structure. The method includes placing the battery pack in a bay defined by the frame structure, and connecting a first latch part on the frame structure to a second latch part on the battery pack such that the battery pack is attached to the frame structure. Connecting the latch parts includes placing a striker of the first latch part in a receiving member of second latch part, applying a force to compress a biasing seal between the battery pack and a surface of the chassis or the body, moving the latching hook into the striker to achieve a latch-release position, and relieving the force applied to the biasing seal such that the biasing seal urges the latching hook into engagement with the striker to achieve a latched position.

BRIEF DESCRIPTION OF THE DRAWING(S)

The foregoing summary and the following detailed description will be better understood when read in conjunction with the appended drawings, which illustrate a preferred embodiment of the invention. In the drawings.

Figure 1:
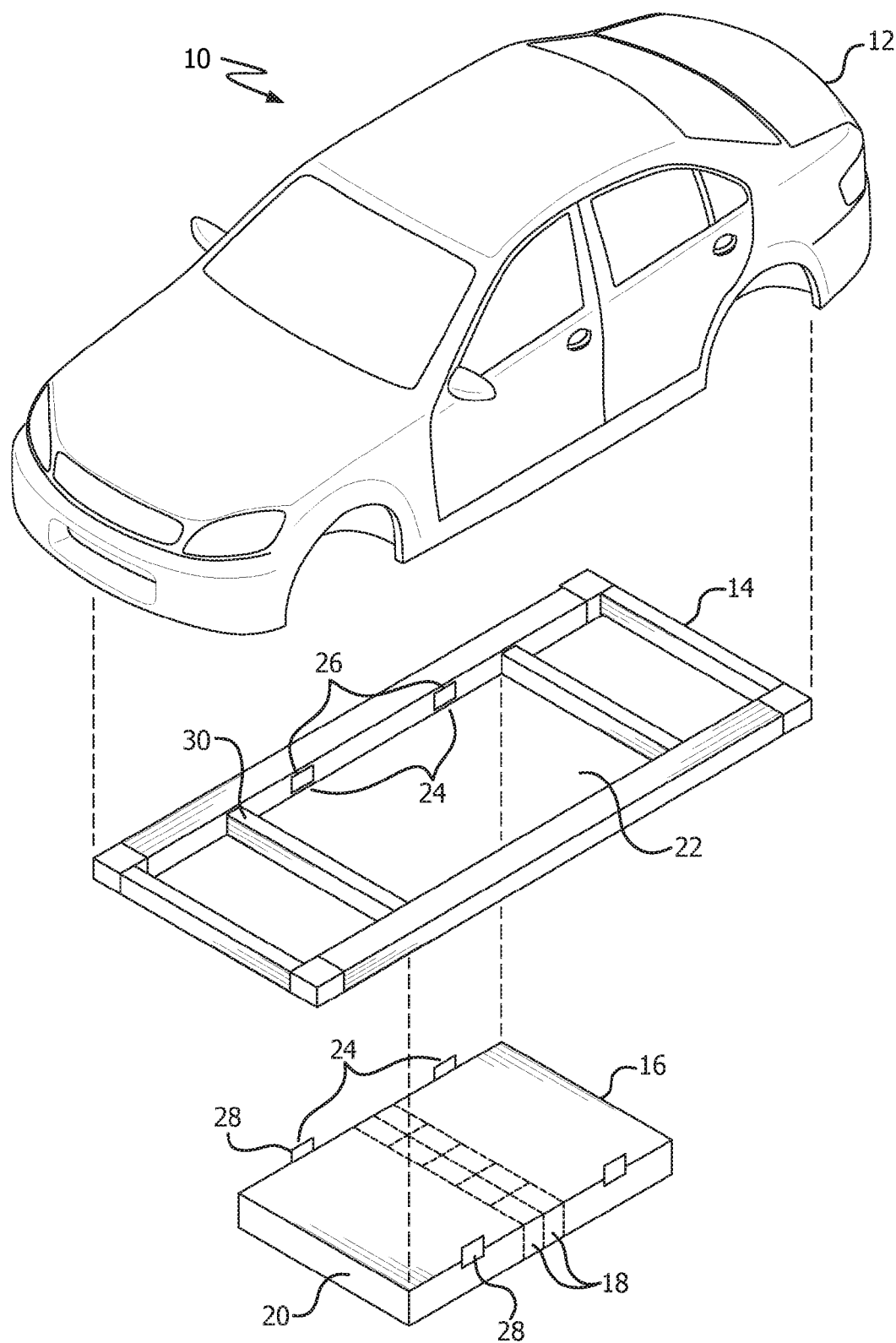
FIG. 1 is an exploded view of an exemplary vehicle.
Figure 6C:
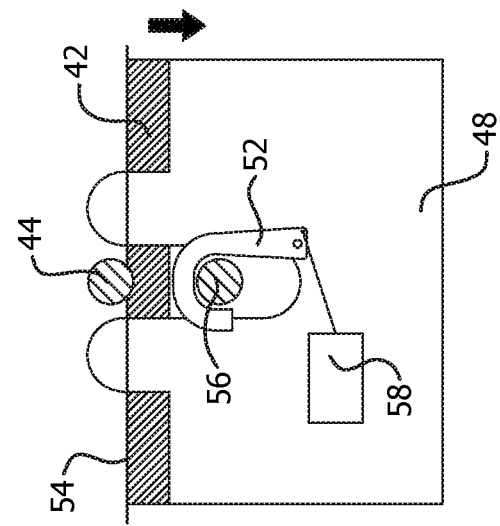
Figure 6B:
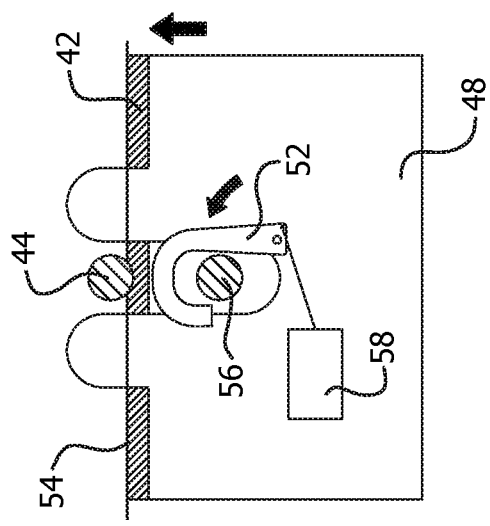
Figure 6A:
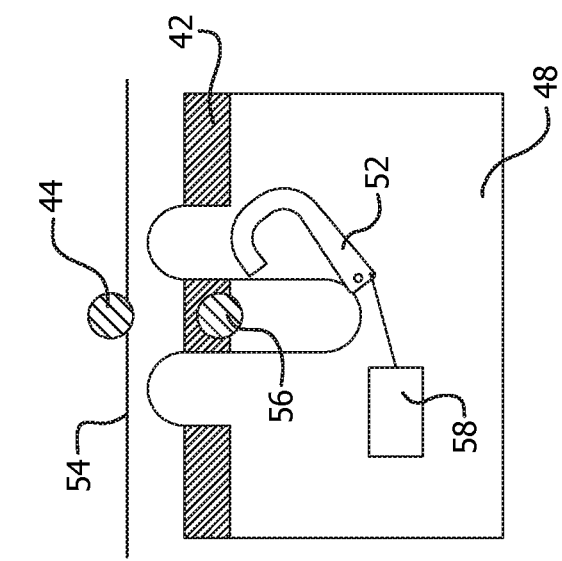
Figure 7A:
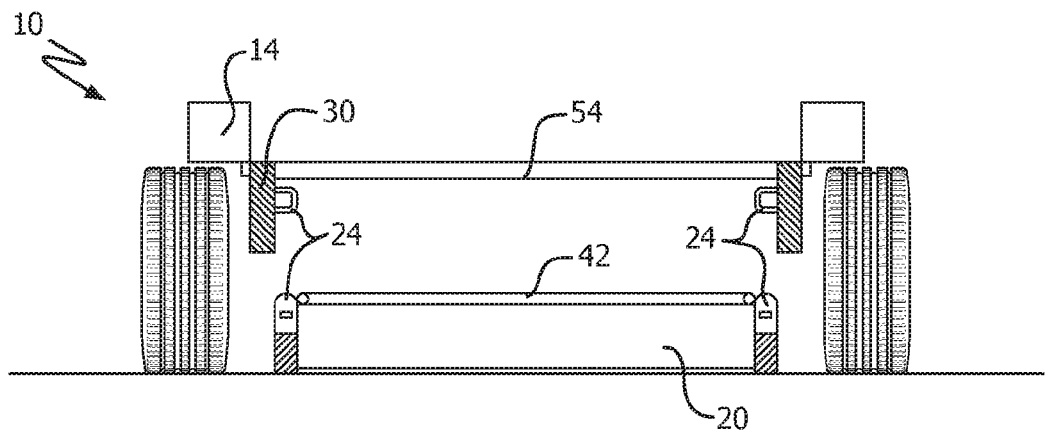
Figure 7B:
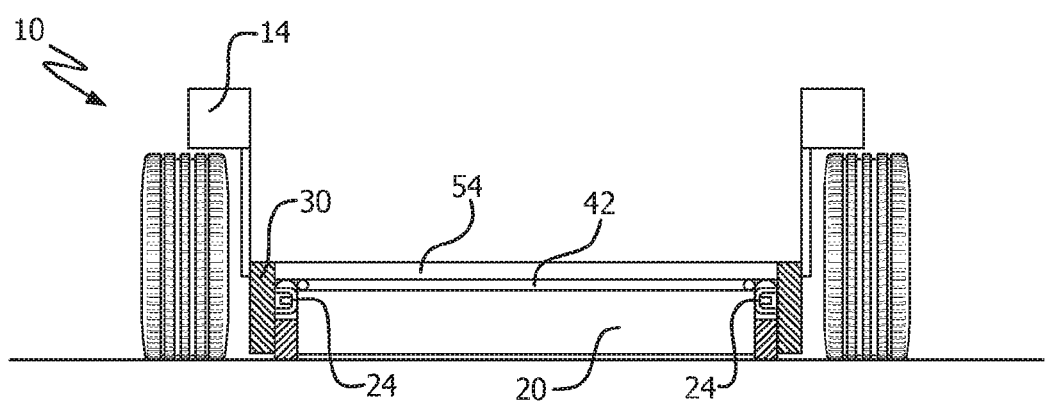
Figure 7C:
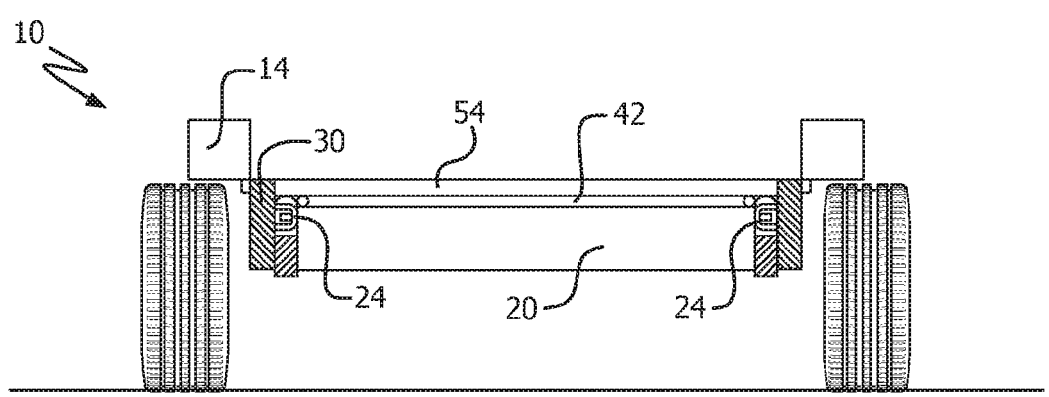
Figure 8A:
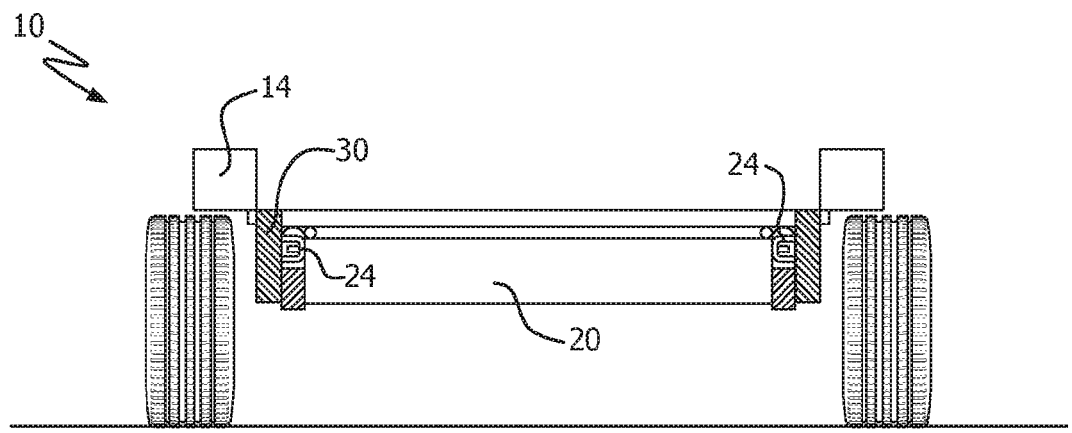
Figure 8B:
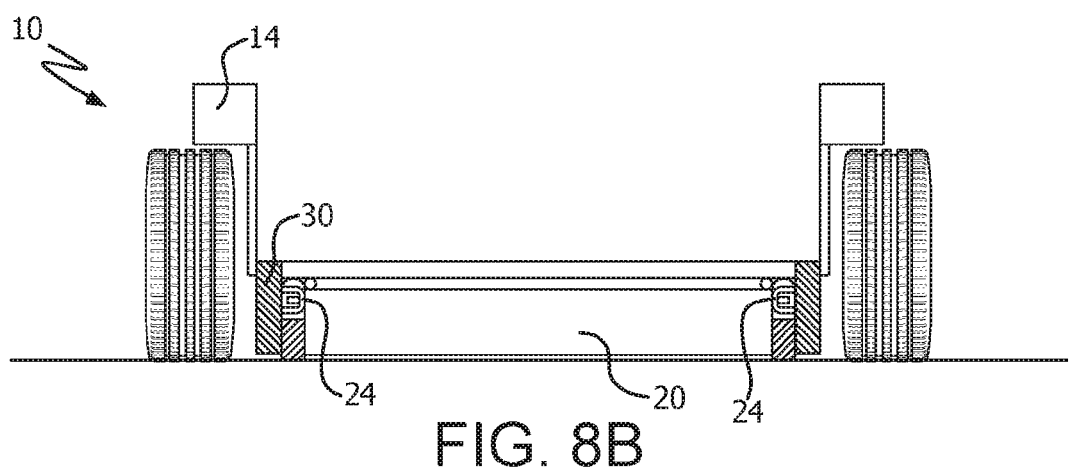
Figure 8C:
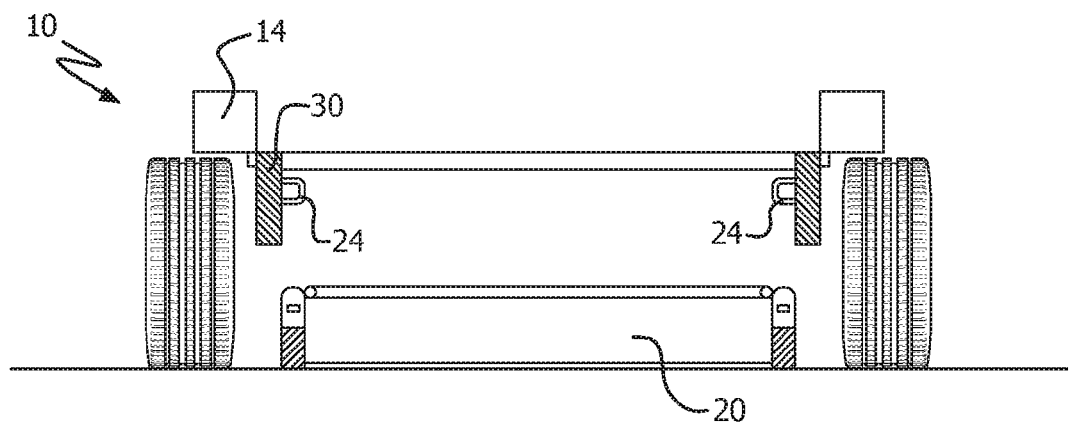
Figure 9A:
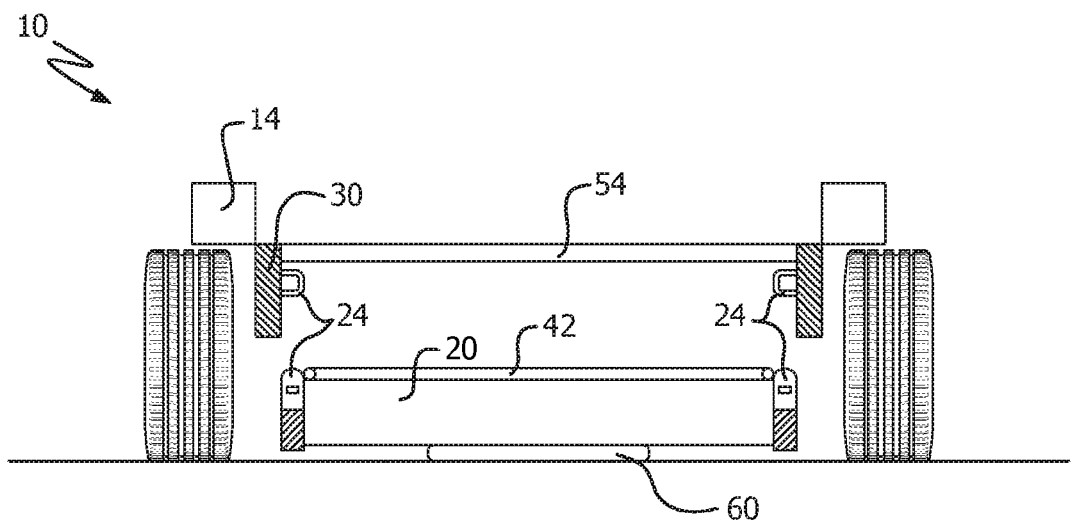
Figure 9B:
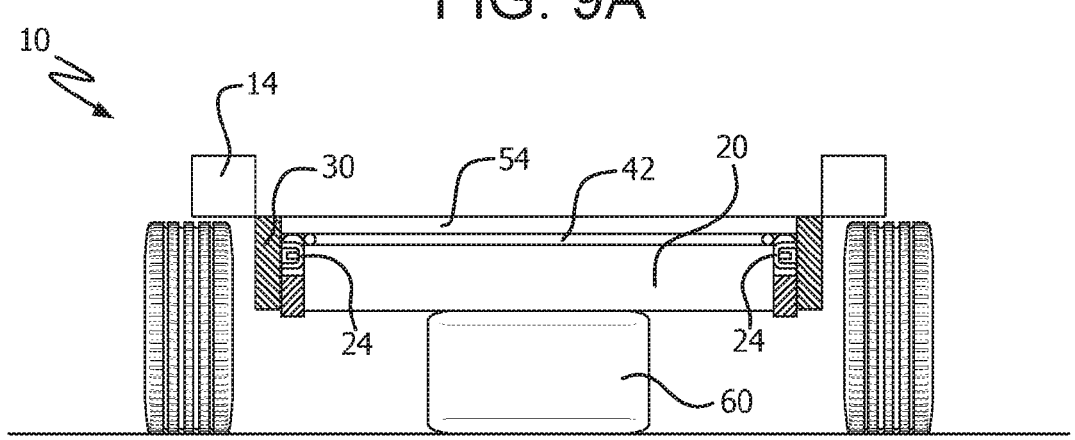
Figure 9C:
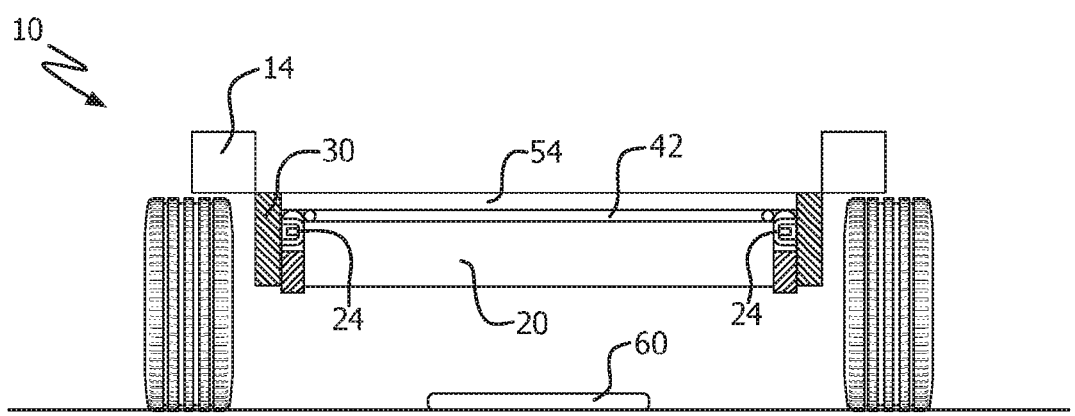
Figure 10A:
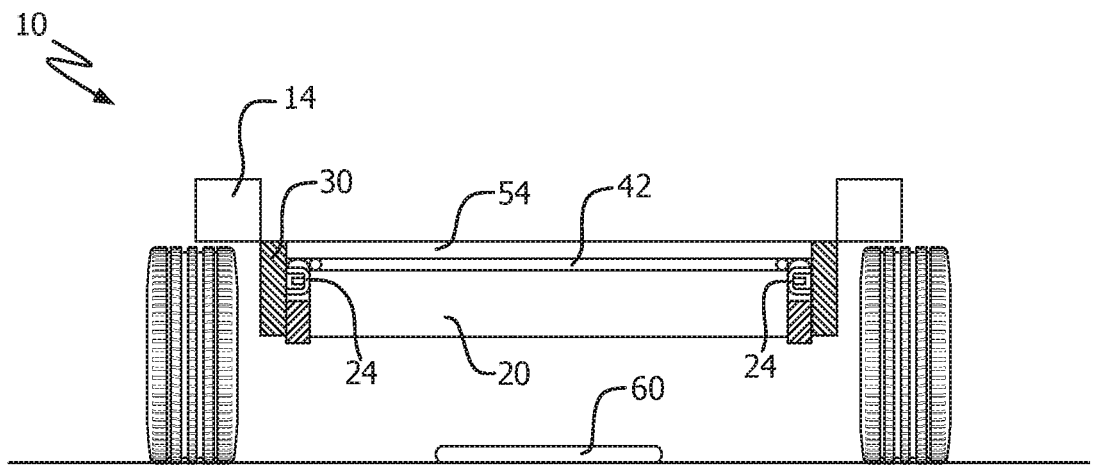
Figure 10B:
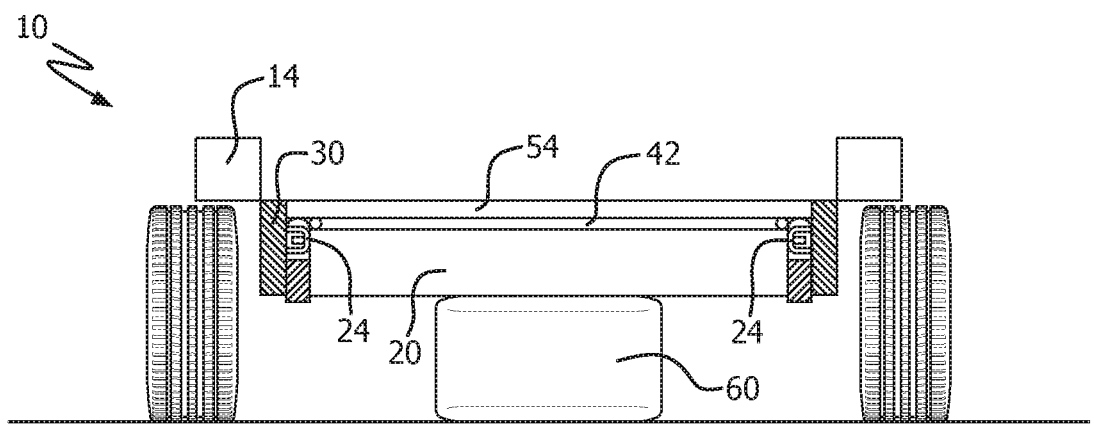
Figure 10C:
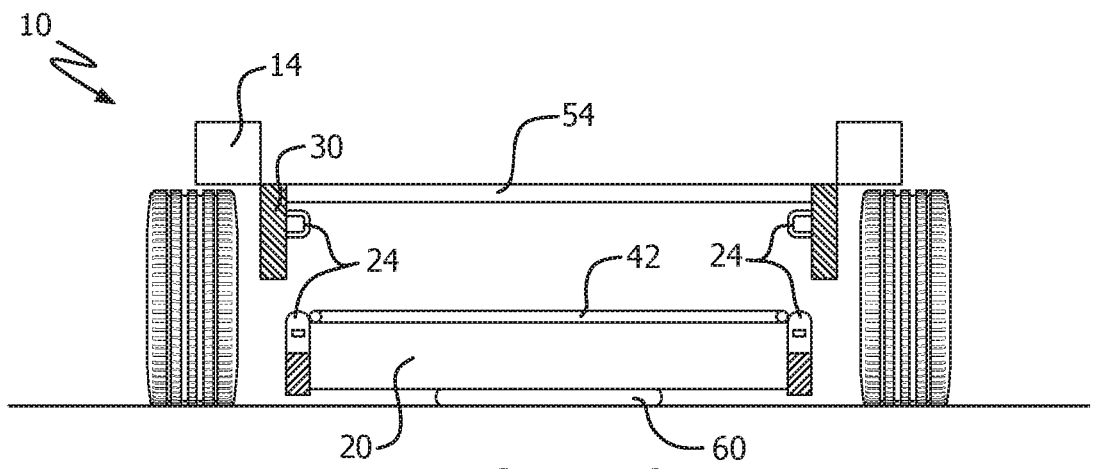
Figure 11:
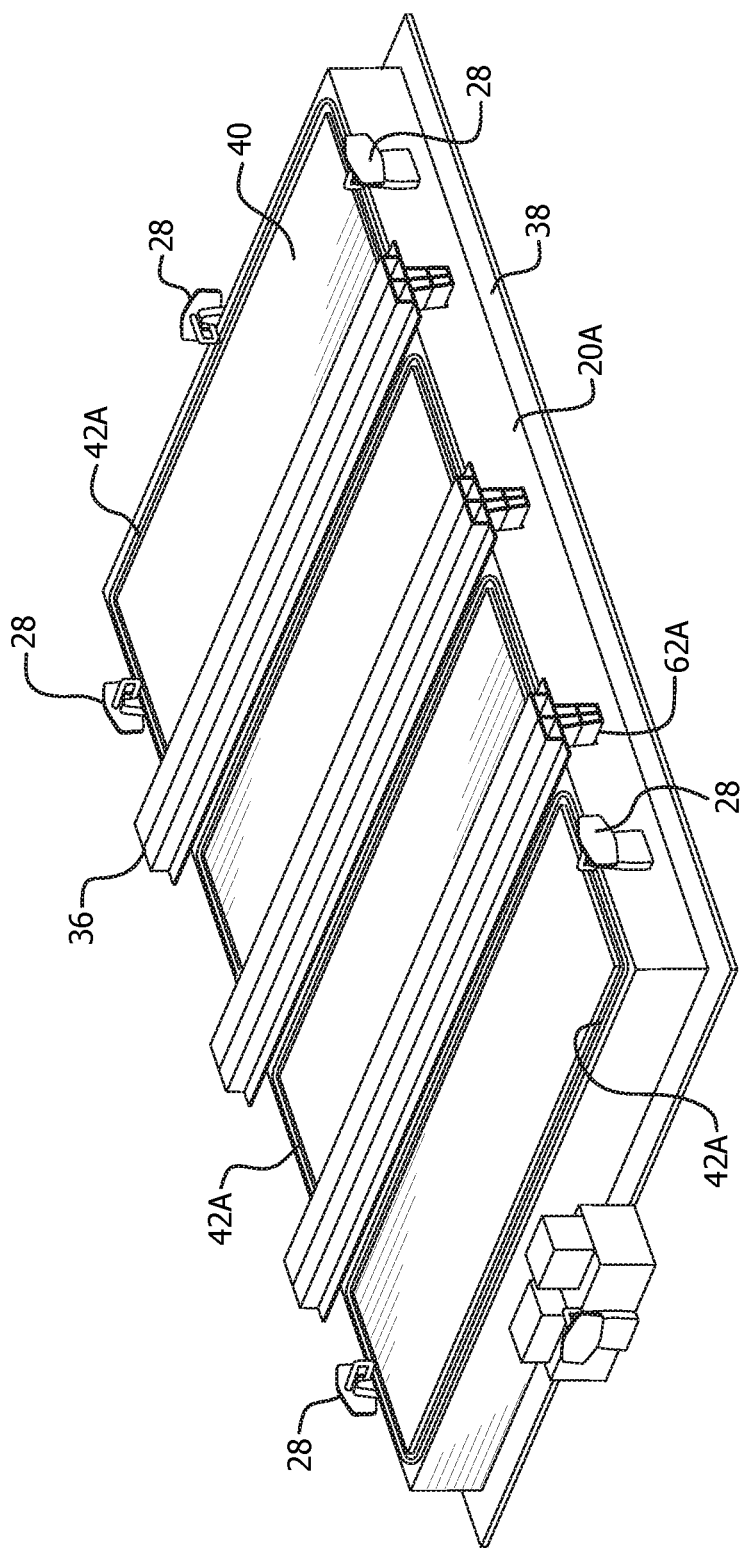

FIGS. 6A-6C further illustrate the latching process, including various positions of a latching hook;

FIGS. 7A-7C illustrate a vehicle at various stages of a battery attachment process;

FIGS. 8A-8C illustrate a vehicle at various stages of a battery detachment process;

FIGS. 9A-9C illustrate a vehicle at various stages of another battery attachment process;

FIGS. 10A-10C illustrate a vehicle at various stages of another battery detachment process; and FIG. 11 illustrates an alternative structure for a battery that may be used in conjunction with the vehicle of FIG. 1.

DETAILED DESCRIPTION OF THE PREFERRED EMBODIMENT(S)

Disclosed embodiments provide an attachment mechanism for securing a battery pack to a frame structure of a vehicle. The attachment mechanism is configured to allow the battery pack to be quickly attached and detached from the vehicle, enabling a discharged battery pack to be easily replaced with a charged battery pack. In at least some embodiments, the attachment mechanism includes an actuatable latch which is movable between an unlatched position and a latched position. The disclosed embodiments further provide exemplary attachment and detachment processes utilizing the disclosed attachment mechanism.

FIG. 1 is an exploded view illustrating an exemplary vehicle 10. Vehicle 10 includes at least a body 12, a chassis 14, and a battery system 16. The body 12 includes the features and components that form the passenger compartment and exterior shell of the vehicle 10. The body 12 is supported on and by the chassis 14. The chassis 14 is a skeleton frame structure which includes, for example, a plurality of interconnected frame components, such as rigid bars, plates, fasteners, etc. The chassis 14 forms a base for supporting the body 12 and which is supported off of the ground by the wheels of the vehicle 10. The chassis 14 essentially forms a bottom portion of the vehicle 10. The battery assembly 16 is integrated into the body 12 and chassis 14 and provides electrical energy to a power system of the vehicle 10 through a plurality of electrical storage devices 18 provided in one or more battery packs 20.

Consistent with disclosed embodiments, vehicle 10 is an electric vehicle. This means that the electrical storage devices 18 provide electrical energy to a motor (not shown) for generating mechanical power to move the vehicle 10. For example, in some embodiments, vehicle 10 is an all-electric vehicle in which all or substantially all of the power generated to move vehicle 10 is provided by the electrical storage devices 18. In these embodiments, the vehicle 10 includes an engine only as a backup power source or does not include an engine. In other embodiments, vehicle 10 is a hybrid vehicle in which some of the power generated by the power system 16 is provided by the electrical storage devices 18 and a remainder of the power is provided by an engine, such as an internal combustion engine.

It should be understood that the battery assembly 16 includes additional components which allow the electrical storage devices 18 to be utilized to provide electrical energy to a motor to power the vehicle 10. For example, the battery assembly 16 may include electrical connections (e.g., wiring, bus bars, etc.), cooling features (e.g., cooling panels), control system components (e.g., controllers, sensors, actuators, etc.), and the like, in order to allow the vehicle 10 to operate via electrical energy.

As shown in FIG. 1, the battery pack 20 is generally sized and shaped to fit in a bay 22 of the chassis 14. The battery pack 20 is movable into and out of the bay 22 in order to facilitate attachment and removal of the battery pack 20 to and from the vehicle 10. A latching mechanism 24 releasably attaches the battery pack 20 to the chassis 14. In an exemplary embodiment, the latching mechanism 24 includes a plurality of first latch parts 26 on the chassis 14 and a plurality of second latch parts 28 on the battery pack 20. The first latch parts 26 are connectable to the second latch parts 28 in order to secure the battery pack 20 in the bay 22.

Figure 2:
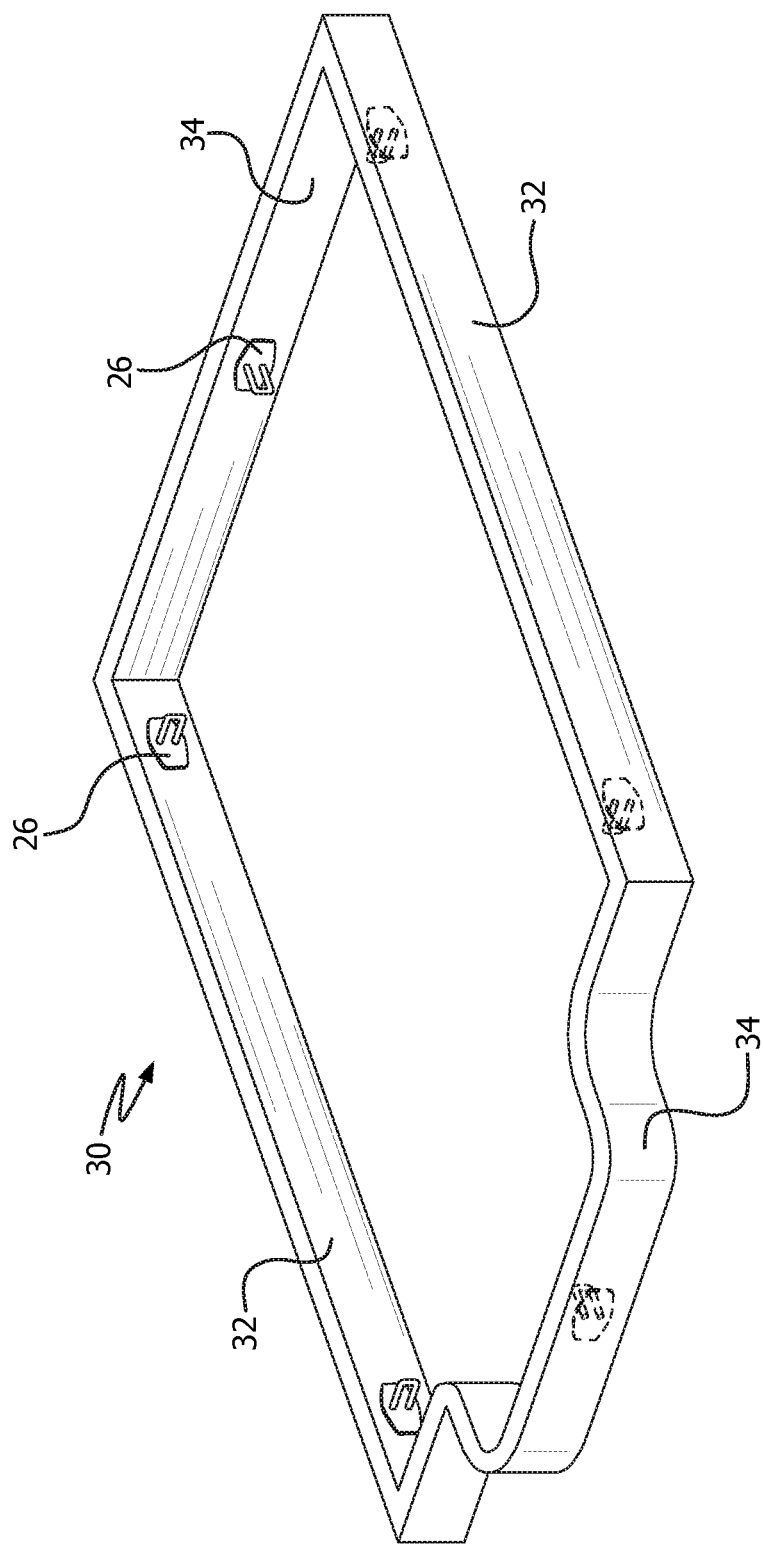
FIG. 2 is a perspective view of an exemplary frame structure which may be used in conjunction with vehicle of FIG. 1.

FIG. 2 is a perspective view of an exemplary frame structure 30 configured to receive the battery pack 20. The frame structure 30 is preferably integrated into the chassis 14 of the vehicle 10. In other embodiments, the frame structure 30 may be attached to an existing chassis 14 or other frame structure of the vehicle 10. The frame structure 30 provides a supporting structure for the battery pack(s) 20 of the battery assembly 16.

The frame structure 30 includes a plurality of interconnected support members, such as rails, bars, panels, etc., which define the battery-receiving bay 22. In one embodiment, the frame structure 30 includes at least a pair of side rails 32 and a pair of end rails 34. As shown in FIG. 2, the side rails 32 and/or end rails 34 may be linear, angled, curved, or otherwise shaped to match a corresponding battery pack 20 or body 12. In other embodiments, the frame structure 30 may further include a plurality of cross rails 36 (shown in FIG. 11) which interconnect the side rails 32 and separate the bay 22 into a plurality of spaces for receiving at least a portion of a battery pack 20.

The frame structure 30 includes the first latch parts 26 spaced around a perimeter thereof. For example, the frame structure 30 may include one or more first latch parts 26 on each of the side rails 32 and end rails 34. Each first latch part 26 is attached to a respective side rail 32 or end rail 34 in a secure manner, e.g., by fasteners.

Figure 3:
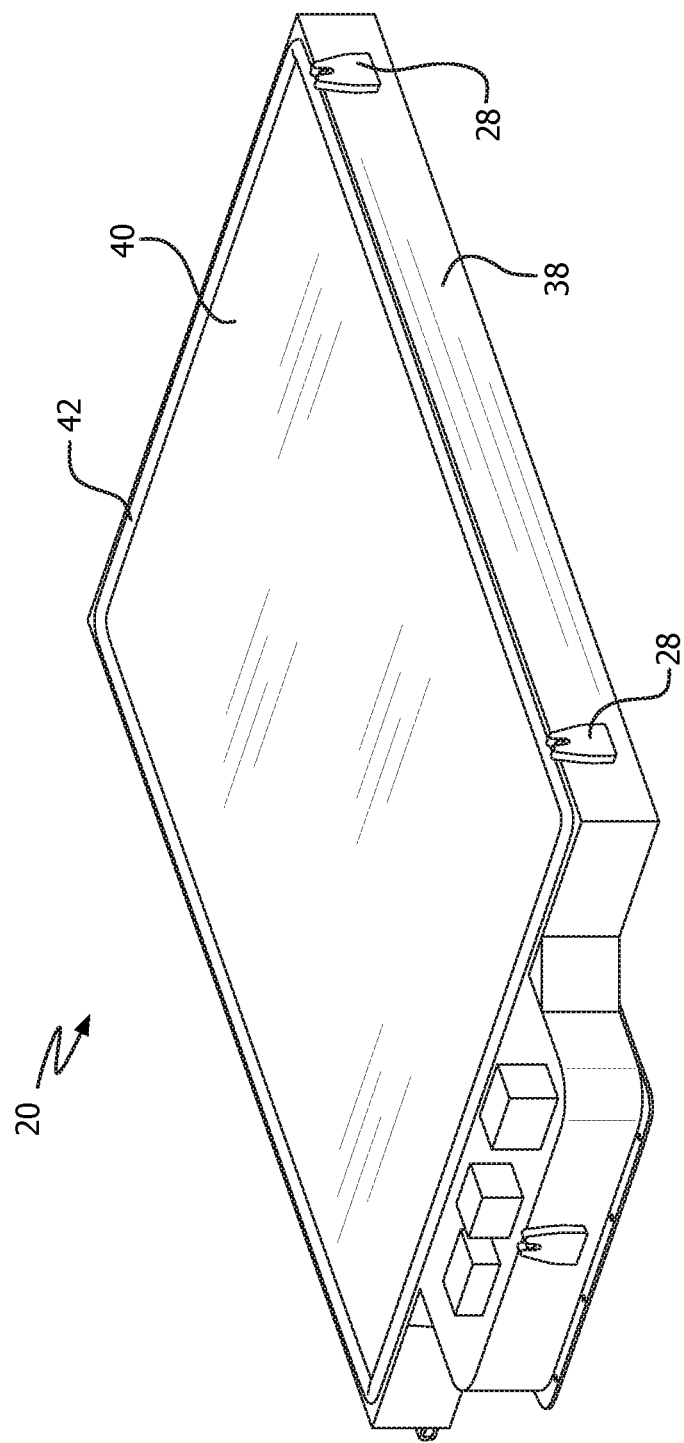
FIG. 3 is a perspective view of an exemplary battery pack which may be used in conjunction with the vehicle of FIG. 1.

FIG. 3 is a perspective view of an exemplary battery pack 20 of the battery assembly 16. The battery pack 20 may include a shape which generally matches the shape of the frame structure 30, but could be any shape. For example, the battery pack 20 may be generally rectangular. The battery pack 20 preferably includes a container 38 which encloses the plurality of electrical storage devices 18, including a separate or integral lid 40.

The battery pack 20 includes the second latch parts 28 spaced around a perimeter thereof at locations which correspond to the positioning of the first latch parts 26. For example, the battery pack 20 may include the same number of second latch parts 28 as the frame structure 30 includes first latch parts 26. In this way, each first latch part 26 is configured to mate with a corresponding second latch part 28 in order to secure the battery pack 20 to the frame structure 30.

The latching mechanism 24 preferably also includes a biasing seal 42 positioned around a perimeter of the container 38 and/or lid 40 of the battery pack 20. The biasing seal 42 may be, for example, an elastic polymer having good sealing qualities and configured to provide a biasing force when compressed.

Figure 4B:
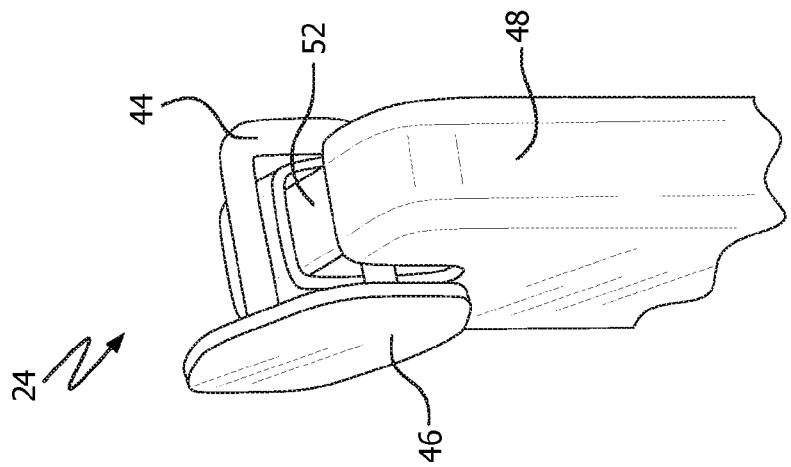
FIG. 4B illustrates the latching mechanism of FIG. 4A in a latched position.
Figure 4A:
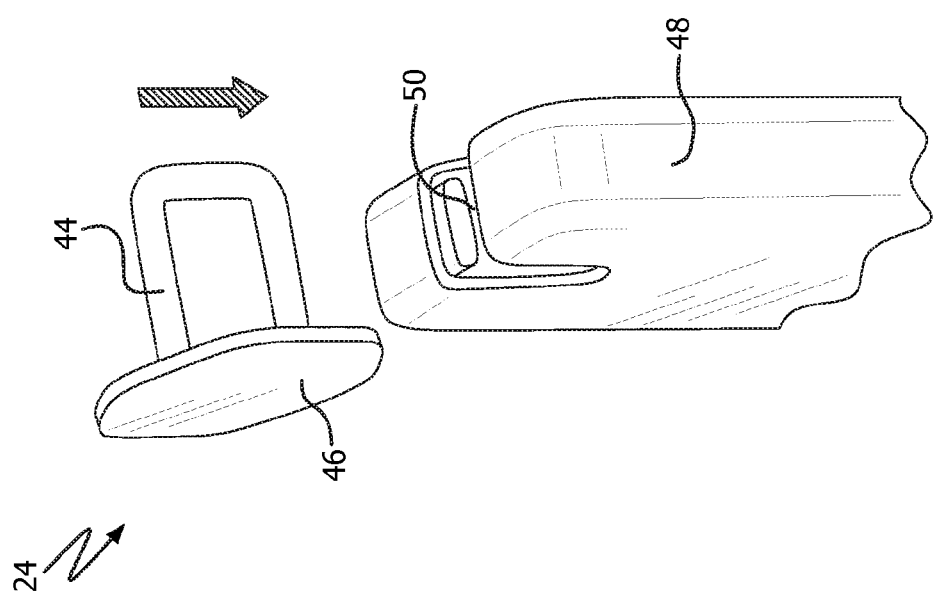
FIG. 4A illustrates an exemplary latching mechanism in an unlatched position.

FIGS. 4A-4B further illustrate an exemplary latching mechanism 24 including the first latch part 26 and the second latch part 28. In the illustrated embodiment, the first latch part 26 is a striker 44 formed by a U-shaped bar extending from an attachment plate 46. The attachment plate 46 is securable to the frame structure 30. In an exemplary embodiment, the second latch part 28 is formed as a receiving member 48 including a slot 50 for receiving the striker 44 therein. The second latch part 28 further includes a latching hook 52 which is configured to secure the striker 44 in the slot 50.

The latching mechanism 24 preferably includes features that provide a secure connection between the first latch part 26 and the second latch part 28, while also providing a connection that is quickly and easily moved between unlatched (FIG. 4A) and latched (FIG. 4B) positions, and vice versa. For example, the latching mechanism 24 (e.g., the second latch part 28) preferably includes an electronic control mechanism (shown schematically in FIGS. 6A-6C) which provides electronic control of the latching hook 52.

Figure 5A:
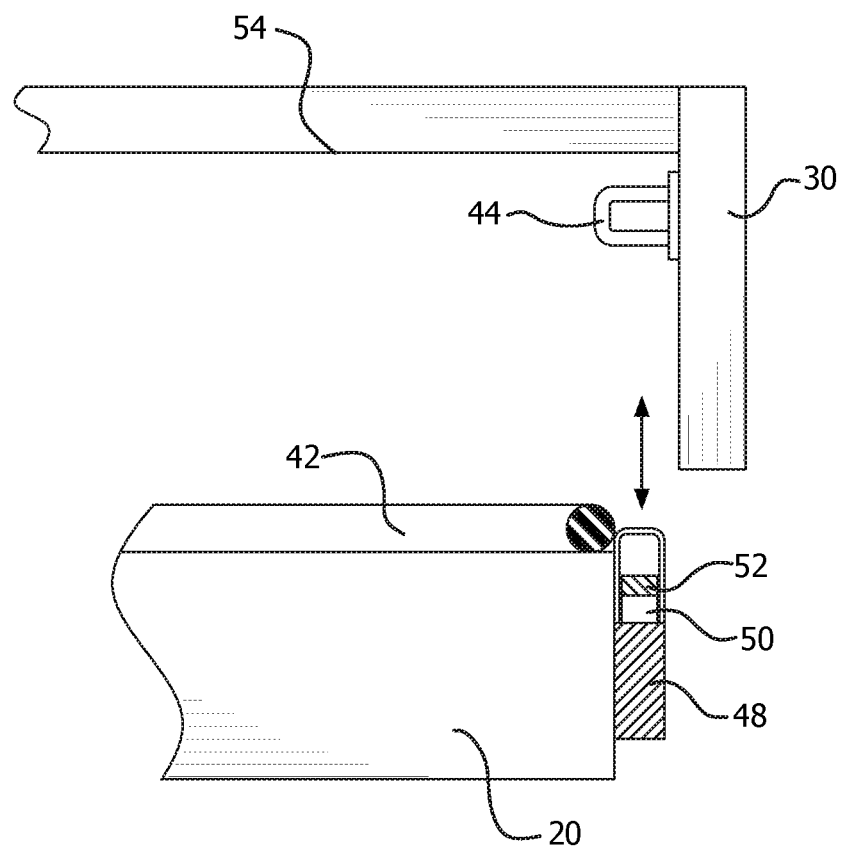
FIGS. 5A-5B illustrate a process for attaching the battery pack to the frame structure.
Figure 5B:
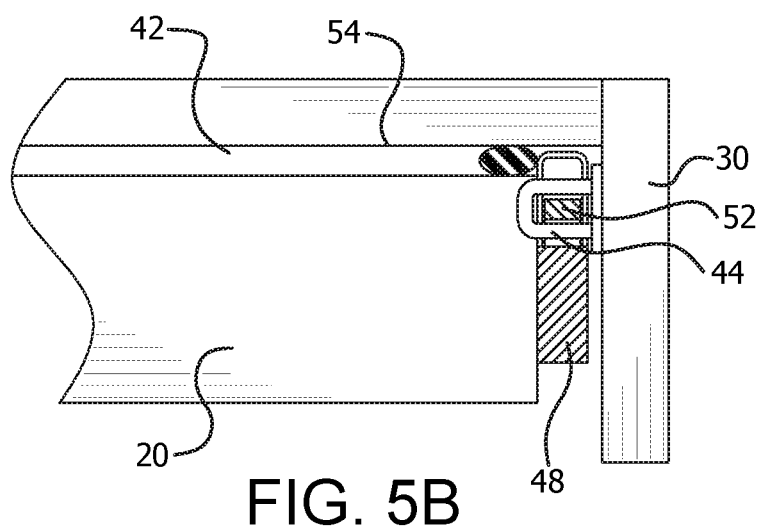

FIGS. 5A-5B illustrate a portion of the frame structure 30 including a striker 44 and a portion of the battery pack 20 including a receiving member 48 with a latching hook 52, and a biasing seal 42 formed on an upper portion of the battery pack 20. In FIG. 5A, the battery pack 20 is disconnected from the frame structure 30. In order to attach the battery pack 20 to the frame structure 30, the receiving member 48 is moved toward the striker 44 (or vice versa) until the striker 44 enters the slot 50 and reaches a latching position in which the latching hook 52 is inserted into the opening in the striker 44.

The components are preferably sized and positioned such that the biasing seal 42 contacts a surface 54 and compresses as the striker 44 is moving in the slot 50. The surface 54 may be a part of a floor panel that separates the passenger compartment from the chassis 14. In other embodiments, the surface 54 is a flange attached to the chassis 14. An expansion force of the compressed biasing seal 42 helps to keep the latching hook 52 in the striker 44 opening such that an inadvertent release of the battery pack 20 is avoided.

FIGS. 6A-6C further illustrate the disclosed latching method. For example, FIG. 6A illustrates an unlatched position in which the striker 44 is near a top of the slot 50 and is freely movable. In an attachment process, the striker 44 travels further into the slot 50 until it reaches a bottom of the slot 50. FIG. 6B illustrates a latch-release position in which the latching hook 52 is positioned in the opening in the striker 44. In this position, the biasing seal 42 is compressed against the surface 54 and a space is present between the lower striker bar 56 and the latching hook 52. FIG. 6C illustrates a latched position in which the lower striker bar 56 is cinched up higher in the latching hook 52 such that the striker 44 is prevented from leaving the slot 50. In the latched position, the biasing seal 42 provides a force to retain the striker 44 in the latching hook 52 such that the latching hook 52 is inhibited from inadvertently moving to the unlatched position.

FIGS. 6A-6C schematically illustrate a control mechanism 58 which is part of the second latch part 28. The control mechanism 58 is configured to move the latching hook 52 into and/or out of the striker 44 when the latching mechanism 24 is in the latch-release position illustrated in FIG. 6B. The control mechanism 58 includes, for example, a receiver for receiving a control signal, a controller for processing the control signal, and a motor for moving the latching hook 52.

The battery pack 20 (and/or a plurality of battery packs 20) can be quickly and securely attached to the frame structure 30 by using a plurality of the disclosed latching mechanisms 24. As described above, the latching mechanism 24 is movable between a plurality of positions, including an unlatched position in which the striker 44 is freely movable, a latch-release position in which the latching hook 52 is freely movable into and out of the striker 44, and a latched position in which the latching hook 52 and striker 44 are held in contact with each other to prevent disconnection.

Moreover, the control mechanism 58 is electronically and remotely controllable such that the latching hook 52 can be moved into and out of the striker 44 to easily move between the latched and unlatched positions through any of a variety of control schemes. For example, the control mechanism 58 may be controlled by an operator (either nearby or distant) and/or by an automated system (e.g., based on the detection of one or more sensors). In some embodiments, the latching hook 52 is configured to automatically move to the latch-release position and/or the latched position when the lower striker bar 56 reaches the bottom of the slot 50.

In order to attach the battery pack 20 to the frame structure 30, the battery pack 20 is moved into the bay(s) 22 and the first latch parts 26 are connected to the second latch parts 28. This includes placing the striker 44 in the receiving member 48 and applying a force to compress the biasing seal 42 between the battery pack and the surface 54. The compression force is preferably sufficient to allow the latching hook 52 to enter the striker 44 and achieve the latch-release position in which the latching hook 52 is out of engagement with the striker 44. The force compressing the biasing seal 42 is then relieved such that the biasing seal 42 is able to apply an expansion force on the battery pack 20 which urges the latching hook 52 into engagement with the striker 44 to achieve the latched position.

The biasing seal 42 is thus capable of providing a force which maintains the connection between the first latch parts 26 and the second latch parts 28. More specifically, the biasing seal 42 urges the latching hook 52 into engagement with the striker 44 such that the latching mechanism 24 is inhibited from being inadvertently disconnected. Release of the latching mechanism 24 occurs only after a force is reapplied to compress the biasing seal 42, moving the latching hook 52 to the latch-release position. At this point, the latching hook 52 may be moved out of the striker 44, such as through activation by the control mechanism 58. The biasing seal 42 further acts as a sealing member which prevents foreign matter and debris (e.g., water, mud, etc.) from entering the space above the battery pack 20.

FIGS. 7A-7C illustrate an exemplary battery pack attachment process for the vehicle 10 using a plurality of latching mechanisms 24. In FIG. 7A, the bay 22 of the frame structure 30 is empty and the vehicle 10 is moved such that the battery pack 20 is positioned directly under the bay 22. For example, the vehicle 10 is driven over the battery pack 20 and/or the battery pack 20 is slid under the vehicle 10.

In FIG. 7B, the frame structure 30 of the vehicle 10 is lowered onto the battery pack 20. For example, the chassis 14 may be hydraulically or pneumatically controllable such that the frame structure 30 is capable of being lowered toward the ground and raised back up. In the disclosed method, the frame structure 30 is lowered such that the strikers 44 enter the slots 50 of corresponding receiving members 48 and continue until the biasing seal 42 is compressed against the surface 54, placing the latching mechanisms 24 in the latch-release position. In this embodiment, the weight of the vehicle 10 (e.g., the body 12) applies the force to compress the biasing seal 42. The latching hooks 52 are subsequently moved into the strikers 44, through automated and/or manual control of control mechanisms 58.

After the latching hooks 52 are in the strikers 44, the frame structure 30 is lifted off of the ground (e.g., through the hydraulic or pneumatic control) and moved back to its normal position under the vehicle 10. This action lifts the battery pack 20 off of the ground with the frame structure 30 and relieves the compression of the biasing seal 42, moving the latching mechanisms 24 into the latched position.

At this point, the battery pack 20 is securely attached to the frame structure 30 such that the vehicle 10 can safely travel. Additional connections (e.g., electrical, cooling, etc.)

may be made separately at any time during the attachment process and/or arranged such that connection of latching mechanism also causes the additional connections to be secured.

FIGS. 8A-8C illustrate an exemplary battery pack detachment process for the vehicle 10. The detachment process is in some aspects the reverse of the above-described attachment process. In FIG. 8A, the battery pack 20 is securely attached to the frame structure 30 by the plurality of latching mechanisms 24. In order to initiate the detachment process, the frame structure 30 is lowered until the position of FIG. 8B is reached. In this position, the biasing seal 42 is compressed by the weight of the vehicle 10, allowing the latching mechanisms 24 to move to the latch-release position. The latching hooks 52 are then controlled to move out of the strikers 44, effectively disconnecting the battery pack 20 from the frame structure 30. The frame structure 30 is then moved upward, such as to the position shown in FIG. 8C. In other embodiments, the frame structure is moved upwardly only as necessary (if at all) to allow the battery pack 20 to be moved out from under the vehicle 10 and a new (e.g., charged) battery pack 20 to be moved under the frame structure 30 (or the vehicle 10 moved from over one battery pack 20 to another). At this point some or all of the steps of the battery pack attachment process may be performed to attach a new battery pack 20 to the frame structure 30.

Through the above-described processes, a charged battery pack may be quickly and easily attached to a vehicle and then detached (e.g., when discharged) in favor of another (e.g., charged) battery pack. While the above-described embodiment describes movement of a frame structure, it should be understood that the same effects may be achieved through other means which do not include chassis movement. For example, a battery pack may be raised into the receiving bay and secured via actuation of the latching mechanisms, and subsequently removed by applying a further upward force on the battery pack to allow the latching hooks to move out of the strikers. FIGS. 9A-9C and 10A-10C illustrate exemplary processes consistent with this embodiment.

For example, FIGS. 9A-9C illustrate another exemplary battery pack attachment process. In FIG. 9A, the battery pack 20 is again detached from the frame structure 30. As shown in FIG. 9B, the battery pack 20 is subsequently raised into the bay 22 by a jack 60 and pressed upwardly until the latch-release position is reached. In this embodiment, the jack 60 applies the force to compress the biasing seal 42. The jack 60 may be, for example, a mechanical jack, an airbag jack, a movable platform, or the like. After the latching hooks 52 are secured in the strikers 44, the jack 60 is removed and the biasing seal 42 moves the latching mechanisms 24 into the latched position.

FIGS. 10A-10C illustrate another exemplary battery pack detachment process which uses the jack 60. In FIG. 10A, the battery pack 20 is attached to the frame structure 30. As shown in FIG. 10B, the jack 60 is raised to press the battery pack 20 upwardly (compressing the biasing seal 42), thereby allowing the latching hooks 52 to be moved out of the strikers 44. After the unlatched position is reached, the jack 60 lowers the battery pack 20 onto the ground. A new battery pack 20 may then be placed on the jack 60 and raised into the bay 22 for attachment.

The disclosed latching mechanism is thus applicable to provide an attachment feature which allows for quick and secure attachment of a battery pack to a vehicle, which leads to an ability to quickly swap a discharged battery pack with a charged battery pack. It should be understood that the disclosed embodiments are exemplary, and that other components, features, and/or functionality may be provided. For example, in some embodiments, the latching hooks 52 may be configured to "pull" or "cinch" the battery pack 20 upwardly until the latched position is released. Similarly, upward pressure applied to the battery pack 20 in the latched position may cause the latching hooks 52 to automatically move out of the strikers 44, thereby allowing the battery pack 20 to fall to the ground. Moreover, in some embodiments, the first latch parts 26 and second latch parts 28 may be reversed such that the strikers 44 are provided on the battery pack 20 and the receiving members 48 are provided on the frame structure 30.

Additional advantages may be achieved because the disclosed embodiments are applicable to a variety of different vehicle, chassis, and battery assembly configurations. In other words, the disclosed latching mechanism may be used in conjunction with any type, shape, or configuration of battery pack and vehicle simply by placing a first or second latching part on the battery pack and a corresponding first or second latching part in a corresponding location on the frame structure and utilizing a biasing seal to keep the latch parts engaged. This provides a universal-type connection that is easily adaptable to a variety of different vehicles and battery structures.

FIG. 11 illustrates one alternative structure that may utilize the disclosed latching mechanism. For example, an alternative battery pack 20A includes a plurality of channels 62 running transversely across the container 38 and/or lid 40. The frame structure 30 further includes a plurality of cross rails 36 which span the bay 22. The cross rails 36 are positioned in the channels 62 and may be rigid to provide a protective structure around the battery pack 20A. In this embodiment, a plurality of biasing seals 42A may be provided, one on each battery pack segment present between the cross rails 36.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A removable battery assembly, comprising:
   a battery pack including a plurality of electrical storage devices; and
   a latching mechanism for securing the battery pack to a frame structure of a vehicle, wherein the latching mechanism includes:
   a first latch part configured to be attached to the frame structure;
   a second latch part on the battery pack, the second latch part configured to receive at least a portion of the first latch part; and a biasing seal configured to bias the latching mechanism into a latched position.

2. The removable battery assembly of claim 1, wherein the first latch part is a striker and the second latch part includes a receiving member comprising a slot for receiving the striker.

3. The removable battery assembly of claim 2, wherein the second latch part further includes a latching hook configured to retain the striker.

4. The removable battery assembly of claim 3, wherein the latching mechanism further comprises a control mechanism configured to electronically control the latching hook.

5. The removable battery assembly of claim 3, wherein the biasing seal is configured to bias the latching hook into engagement with the striker in the latching position.

6. The removable battery assembly of claim 1, wherein the biasing seal is an elastic member positioned on a top surface of the battery pack.

7. The removable battery assembly of claim 6, wherein the elastic member extends around a perimeter of the top surface of the battery pack.

8. A vehicle, comprising:
a body forming a passenger compartment;
a chassis supporting the body, the chassis including a frame structure; and
a removable battery assembly comprising:
a battery pack including a plurality of electrical storage devices enclosed in a container; and
a latching mechanism for securing the battery pack to the frame structure, wherein the latching mechanism includes:
a first latch part on the frame structure;
a second latch part on the battery pack, the second latch part configured to connect to the first latch part to attach the battery pack to the frame structure; and
a biasing seal configured to bias the latching mechanism into a latched position.

9. The vehicle of claim 8, wherein the biasing seal is compressed between the battery pack and a surface of the chassis or the body in the latching position.

10. The vehicle of claim 9, wherein the surface is a part of a floor panel separating the passenger compartment from the chassis.

11. The vehicle of claim 9, wherein the surface is a part of a flange connected to the chassis.

12. The vehicle of claim 9, wherein the first latch part is a striker and the second latch part includes a receiving member and a latching hook,
wherein the receiving member includes a slot for receiving the striker and the latching hook is configured to retain the striker.

13. The vehicle of claim 12, wherein the compression of the biasing seal to urge the latching hook into engagement with the striker in the latching position.

14. The vehicle of claim 13, wherein the biasing seal is configured to be further compressed such that the latching mechanism moves to a latch-release position in which the latching hook is out of engagement with the striker.

15. The vehicle of claim 8, wherein the latching mechanism includes a plurality of first latch parts on the frame structure and a plurality of second latch parts on the battery pack.

16. A method of attaching a battery pack to a vehicle, the vehicle comprising a body forming a passenger compartment and a chassis having a frame structure, the method comprising:
placing the battery pack in a bay defined by the frame structure; and
connecting a first latch part on the frame structure to a second latch part on the battery pack such that the battery pack is attached to the frame structure, including:
placing a striker of the first latch part in a receiving member of second latch part;
applying a force to compress a biasing seal between the battery pack and a surface of the chassis or the body;
moving the latching hook into the striker to achieve a latch-release position; and
relieving the force applied to the biasing seal such that the biasing seal urges the latching hook into engagement with the striker to achieve a latched position.

17. The method of claim 16, wherein, in the latch-release position, the latching hook is out of engagement with the striker.

18. The method of claim 16, wherein connecting the first latch part to the second latch part includes lowering the frame structure onto the battery pack, and wherein the weight of the body applies the force to compress the biasing seal.

19. The method of claim 16, wherein connecting the first latch part to the second latch part includes raising the battery pack into the bay, and wherein a jack applies the force to compress the biasing seal.

20. The method of claim 16, further comprising disconnecting the first latch from the second latch to detach the battery pack from the frame structure, including:
reapplying a force to compress the biasing seal and move the latch part to the latch-release position, and
moving the latch part out of the striker.

* * * * *